United States Patent [19]
Hickox et al.

[11] 3,958,840
[45] May 25, 1976

[54] FLEXIBLE BEARING HAVING REINFORCEMENTS

[75] Inventors: Charles C. Hickox, Brigham City; J. Donald McGregor, Logan, both of Utah

[73] Assignee: Thiokol Corporation, Newtown, Pa.

[22] Filed: May 5, 1975

[21] Appl. No.: 574,673

[52] U.S. Cl. ............................ 308/2 A; 308/237 R
[51] Int. Cl.² ................................................ F16C 7/00
[58] Field of Search ............ 308/2 R, 2 A, 3 R, 5 R, 308/26, 237 R, DIG. 8; 267/152, 63 R, 57.1 R; 248/24, 188.8, 350; 14/16

[56] References Cited
UNITED STATES PATENTS

| | | | |
|---|---|---|---|
| 3,397,856 | 8/1968 | Sullivan et al. | 308/3 R |
| 3,429,622 | 2/1969 | Lee et al. | 308/2 R |
| 3,504,903 | 4/1970 | Irwin | 308/2 R X |
| 3,504,905 | 4/1970 | Irwin | 267/152 X |

*Primary Examiner*—M. H. Wood, Jr.
*Assistant Examiner*—Gene A. Church
*Attorney, Agent, or Firm*—Stanley A. Marcus; Edward E. McCullough

[57] ABSTRACT

A flexible bearing is constructed of layers of elastomer and rigid shims, alternately stacked and bonded together. At least some of the rigid shims are replaced with flexible reinforcements of refractory cloth or wire screen. The reinforcing material minimizes the number of rigid shims required. In some applications, the rigid shims may be completely eliminated.

9 Claims, 4 Drawing Figures

FLEXIBLE BEARING HAVING REINFORCEMENTS

BACKGROUND OF THE INVENTION

This invention relates broadly to flexible bearings, and more specifically to bearings that are constructed of alternate layers of reinforced elastomer and rigid shims, stacked and bonded together; so that they are flexible in directions parallel to the layers, but are relatively unyielding in directions perpendicular thereto. The invention described herein was made during the course of or under Contract Number N0003072C0108 with the U.S. Navy.

This type of bearing has many uses, including applications to motor mounts and bridge abutments. More recently, it has been found to be useful for mounting a movable thrust nozzle to a rocket, so that the nozzle may be rotated from side to side for steering the rocket. A typical arrangement of the bearing for this use is shown in FIG. 3 of U.S. Pat. No. 3,429,622 to R. E. Lee, et al., wherein the bearing is labeled "10."

Other U.S. Patents showing this type of flexible bearing are U.S. Pat. Nos. 3,390,899, to J. T. Herbert, et al.; 3,504,902 and 3,504,903 to A. S. Irwin; and 3,504,904 to A. S. Irwin, et al.

When applied to thrust nozzles for rockets, flexible bearings of this construction are commonly quite thick in order to contain enough elastomer to permit a useful degree of angular displacement of the thrust nozzle. Because of the tendency of thick layers of elastomer to be extruded from between the rigid shims, elastomer is conventionally divided into a large number of thin layers — requiring the use of a large number of rigid shims.

In order to promote precision control of the rocket, it is desirable that the thrust nozzle be rotatable about a fixed point. Hence, the rigid shims must all conform to surfaces of concentric spheres to accomplish this objective. Since each shim, therefore, conforms to a sphere of a different radius from all other shims, manufacture of such a bearing is a laborious and expensive process.

SUMMARY OF THE INVENTION

It is a primary object of the present invention to provide a flexible bearing that will afford all of the advantages of flexible bearings for mounting movable thrust nozzles to rockets, but that will be easier and less expensive to manufacture.

This is done by replacing some of the rigid shims with flexible, open-weave reinforcing means, such as refractory cloth or wire screen — preferably having interlocking strands. All rigid shims may be eliminated in some applications.

The invention is essentially a flexible bearing constructed of alternate layers of rigid material and elastomer, wherein at least some of the layers of elastomer contain layers of refractory cloth, wire screen, expanded metal, or plastic net.

In its application as a means for mounting a movable thrust nozzle to a rocket case, the bearing is annular in form. Also, the layers of elastomer reinforcement and rigid material are shaped to conform to surfaces of concentric spheres, so that the thrust nozzle may be rotated about a fixed point. This is desirable for precision control of a rocket.

Important features of the invention are that it is simple and reliable in construction and easy to manufacture.

Other objects and advantages of the invention may become apparent as the following detailed description is read with reference to the drawings. The same numbers refer to the same parts throughout the disclosure.

DESCRIPTION OF THE PREFERRED EMBODIMENTS

Figure 1:
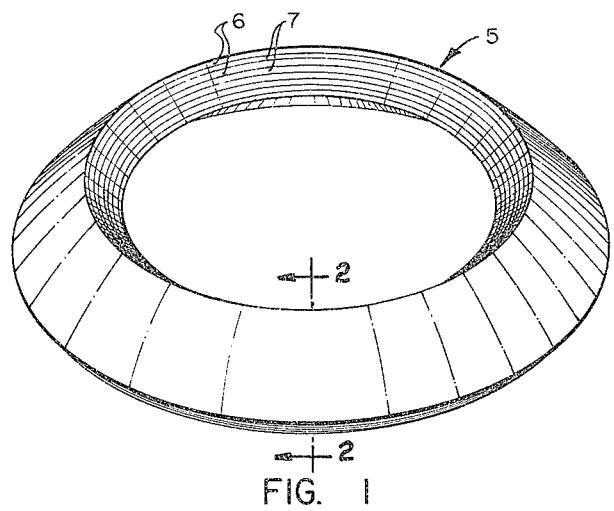
FIG. 1 is a perspective view of the invention.
Figure 2:
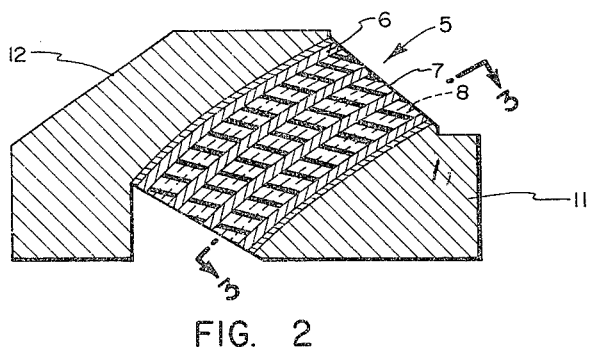
FIG. 2 is a cross section taken on line 2—2 of FIG. 1, plus mounting rings.
Figure 3:
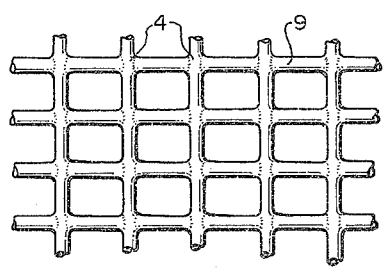
FIG. 3 is a fragmentary section taken on line 3—3 of FIG. 2 to show detail of a reinforcing layer.
Figure 4:
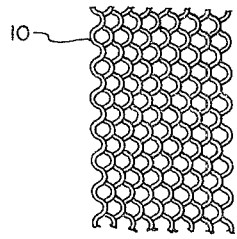
FIG. 4 is similar to FIG. 3, showing a different type of reinforcement.

As shown in FIGS. 1 and 2, the invention is an annular, flexible bearing 5, composed of alternate rigid shims 6 and layers 7 of elastomer, stacked and bonded together. The layers 7 of elastomer have intermediate layers 8 of open-weave reinforcing means, such as wire screen 9 (FIG. 3), expanded metal 10 (FIG. 4), refractory cloth, or plastic netting. In the preferred embodiment, all of these reinforcement means have interlocked strands or members. For example, the screen may be welded or soldered at intersections of the strands (see FIG. 3), and the cloth may be of a special weave wherein intersecting strands are wrapped around each other. This provides sufficient strength to maintain dimensional stability of the elastomer under heavy loads that may be imposed upon it by the propulsive gases, possible in combination with stresses impressed by hydraulic actuators.

In a preferred embodiment, the rigid shims 6 are made of a high temperature steel, the elastomer 7 is a natural rubber having good elastic properties, and the reinforcement 8 is a steel, wire screen of about 10 mesh, the wires of which are welded together at their intersections 4. Other combinations of materials may be used for flexible bearings, depending on the intended purpose. Other useful materials for the reinforcing layers 8, for example, are carbon or fiber glass cloth, having an open weave with interlocked strands, plastic net of nylon, polypopylene, polyethylene, polyvinylchloride, Teflon, etc.

The embodiment shown in FIGS. 1 and 2 is intended for use as a flexible joint between a rocket case and a movable thrust nozzle therefor. As such, it is annular in form; and the rigid shims 6 conform to surfaces of concentric spheres, so that the thrust nozzle (not shown) is rotatable about a fixed point. This promotes precision of control for steering a rocket. Hence, each rigid shim 6 conforms to the surface of a sphere having its own, unique radius. As shown in FIG. 2, the top and bottom layers of elastomer may be bonded directly to adjacent parts, such as the thrust-nozzle mounting ring 11 and the rocket-case mounting ring 12.

In manufacture, the rigid shims 6 are formed by any of a number of well-known techniques, selected as appropriate for the particular material and its thickness. The shims 6 may be coated with an appropriate bonding agent to create a firm bond with the layers 7 of elastomer. However, if the elastomer 7 is of such a nature that it may form a tight bond with the shims 6 on application of heat and pressure, the adhesive coating may not be necessary. The reinforcement 8 may also be coated with adhesive.

Spacers, not shown, are placed between the layers 8 of reinforcing material and between the rigid shims 6, to insure uniformity of spacing; and rings cut from calendered layers of rubber are placed between adjacent layers of reinforcement 8 and rigid shims 6. The spacers are somewhat thinner than the elastomer, so that a certain amount of elastomer is permitted to be extruded at the edges of these members. Firm bonding is then effected by heat and pressure; which simultaneously molds the layers 8 of reinforcing material into concentric, spherical surfaces conforming to those of the rigid shims 6. When the bearing is thoroughly bonded together, the outer edge portions thereof, that contain the spacers, are removed by machining.

The presence of the layers 8 of reinforcing material permits the use of fewer of the rigid shims 6 than would otherwise be necessary. Since these shims 6 are difficult and expensive to manufacture, the total time and expense in making the bearing is considerably decreased by introduction of the reinforcing layers 8 therein.

A valuable and unexpected result of this method of manufacturing flexible bearings is that, during application of heat and pressure, the layers 7 of elastomer extrude through the openings in the screen or cloth reinforcing layers and weld together. This creates a multiplicity of threads of elastomer that pass through each reinforcing layer to retain it firmly in position. In this way, the elastomer forms a much firmer bond with the reinforcing layers 8 than can be obtained between the elastomer 7 and the rigid shims 6. Thus, the invention is not only easier and less expensive to manufacture, but also produces a flexible bearing that is more reliable and less subject to bond failure than previous bearings of this type.

Another valuable and unexpected result is that it incorporates the most desirable features of both thick and thin layer flexible bearing systems. Thick layers of elastomer and rigid material provide satisfactory dimensional stability of the shims, but tend to have poor kinematic performance and high shear stresses in the bearing components. On the other hand, a bearing made of thin layers of elastomer and rigid material tends to have buckling problems, although it has satisfactory kinematic performance and low shear stresses in the rubber. Also, thin shims distort readily under molding pressure, while thicker shims provide easy access and tooling techniques because of their inherent rigidity. In the present invention, both thick shims and thick layers of elastomer may be used, to derive the benefits of dimensional stability; and the layers of reinforcement simulate the thin layer approach to provide good kinematic performance and low shear stresses on components. Also, from a torque standpoint, there is a desirable elastic continuity through the open-weave reinforcing layers, since the elastomer encapsulates each strand of the reinforcing material and extends through the openings therein.

As mentioned previously, in some applications, it is possible to dispense entirely with the rigid shims, especially if the layers 8 of reinforcing material have the required degree of rigidity, e.g., wire screen or a heavy plastic net. It has been found possible to mold such elastomer impregnated layers 8 under heat and pressure so that they conform to concentric spherical surfaces or other desired contours. In such instances, the entire bearing would appear in cross section identical to one of the elastomeric layers 7 of FIG. 2, but perhaps containing more layers 8 of reinforcing material.

An invention has been described that advances the art of flexible bearings. Although the preferred embodiments have been described specifically with regard to detail, it should be noted that many details may be altered without departing from the scope of the invention, as it is defined in the following claims.

The invention claimed is:

1. In a flexible bearing comprising alternate layers of elastomer and rigid material, stacked and bonded together, the improvement comprising:
   at least one layer of open-weave, reinforcing material embedded in at least one layer of elastomer, so that the elastomer may extend through the openings in the weave to encapsulate each strand thereof.

2. The flexible bearing of claim 1 wherein perpendicular strands of the reinforcing material are locked together at their intersections.

3. The flexible bearing of claim 2 wherein the reinforcing material is wire screen, and perpendicular strands thereof are welded together at their intersections.

4. The flexible bearing of claim 2 wherein the reinforcing material is carbon cloth.

5. The flexible bearing of claim 2 wherein the reinforcing material is fiber glass cloth.

6. The flexible bearing of claim 1 wherein the reinforcing material is a plastic net.

7. The flexible bearing of claim 1 that is annular in form and all layers thereof conform to surfaces of concentric spheres.

8. A flexible bearing comprising:
   a plurality of rigid, annular shims, axially alligned, uniformly spaced apart, and conforming to surfaces of concentric spheres;
   an annular layer of elastomer between each pair of adjacent shims and bonded thereto; and
   at least one annular layer of wire screen embedded in each layer of elastomer, perpendicular strands of the screen being interlocked at their intersections.

9. A flexible bearing comprising:
   a plurality of layers of open weave, rigid, reinforcing material having locked-together strands, stacked one upon another; and
   a cured, elastomeric composition encapsulating each strand of the reinforcing material and extending through the openings in the weave thereof, for firm bonding and elastic continuity through the bearing.

* * * * *